Aug. 30, 1966  E. WAINER ET AL  3,269,802
PREPARATION OF CARBIDE STRUCTURES
Filed Dec. 10, 1962

INVENTORS
Eugene Wainer
Mark S. Vukasovich

BY
ATTORNEY

United States Patent Office 3,269,802
Patented August 30, 1966

3,269,802
PREPARATION OF CARBIDE STRUCTURES
Eugene Wainer, Shaker Heights, and Mark S. Vukasovich, Parma, Ohio, assignors to Horizons Incorporated, a corporation of New Jersey
Filed Dec. 10, 1962, Ser. No. 243,277
5 Claims. (Cl. 23—349)

This invention relates to metal carbides in any of a wide variety of physical forms including polycrystalline wool, single crystal whiskers, woven, felted and other non-woven products and to the preparation of said carbide products.

Certain carbides, and particularly the carbides of boron, silicon, and the metals constituting the metallic half of Groups IV, V, and VI of the Mendeleev Periodic Table, namely those elements having atomic numbers 22, 23, 24, 40, 41, 42, 72, 73, 74, 90 and 92 are known to possess useful properties which are retained at elevated temperatures, including both physical strength and chemical inertness. The usual physical forms in which these carbides are presently available does not provide them as flexible fibers capable of being woven or felted into sheet-like products suitable for use as filters, catalysts' supports, reinforcements for structural materials, and other utilities not now within the capabilities of non-flexible, non-fibrous carbides.

One object of this invention is the production of metal carbides in the form of individual fibers whose properties and dimensions can be closely controlled depending on the nature of the raw materials employed and the processing to which these materials are subjected.

Another object of this invention is the production of metal carbides in the form of filamentary on sheet products having shapes, porosities and other physical properties which can be closely predicted.

Still another object of the invention is to provide methods for obtaining novel carbide products without briquetting, compacting, machining, or sintering of metal carbide materials to achieve desired shapes and properties.

Figure 1:
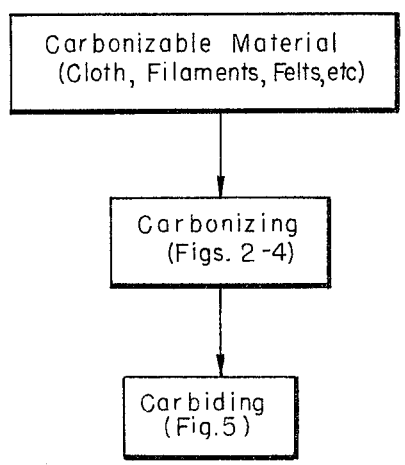
Figure 2:
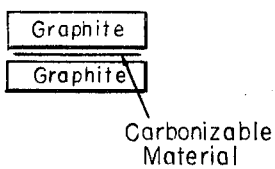
Figure 3:
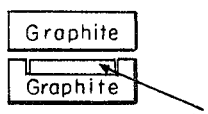
Figure 4:
Figure 5:
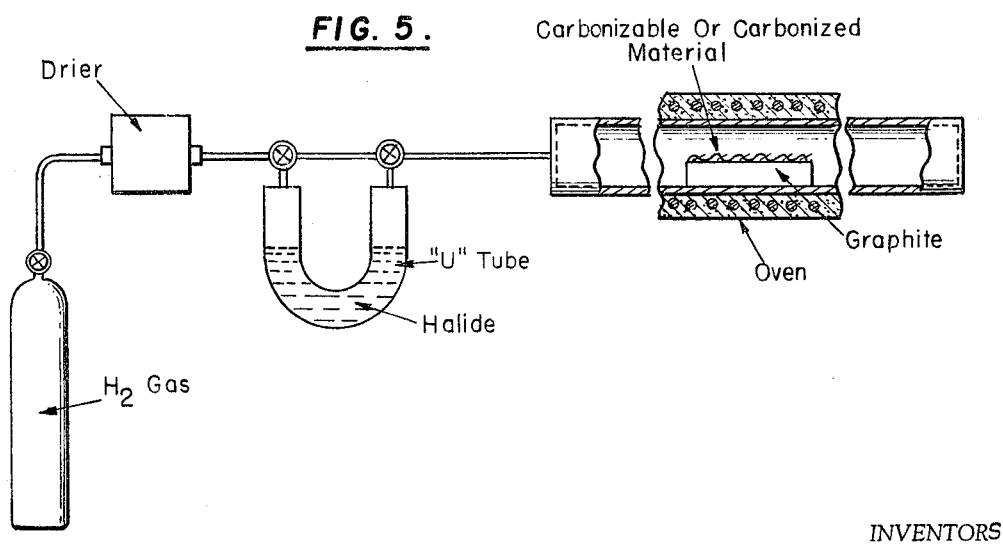

These and other objects are accomplished preferably by the use of the apparatus and methods illustrated in the accompanying drawings in which:

FIGURE 1 is a simplified flow sheet of the process;
FIGURES 2–4 show alternative apparatus for carrying out one step in the process; and
FIGURE 5 shows apparatus suitable for carrying out the process of FIGURE 1.

As shown schematically in the flow sheet of FIGURE 1, the process constituting this invention begins with the carbonization of a carbonizable organic material under conditions which preserve the physical shape and structure of the starting material.

The starting material may be an individual filament such as a thread of cotton, rayon, rubber or other carbonizable material, or it may be a cloth woven from filaments or strands of carbonizable materials, or it may be an aggregate of individual carbonizable filaments in which the filaments are randomly oriented, such as paper or other filter fiber masses, or it may be a composite of carbonizable and non-carbonizable material, such as metal reinforced cloth or other materials of like nature.

The techniques for carbonizing such materials are known. Any of a number of procedures may be followed in this portion of the process without departing from the intended scope of the invention. Known procedures usually involve heating carbonizable material at elevated temperatures in non-oxidizing atmospheres to distill off volatiles and degrade or decompose the organic material into a carbonaceous or graphitized form.

Particularly preferred carbonizing apparatus which has been utilized by us is shown in FIGURES 2–4. FIGURE 2 depicts an apparatus comprising a graphite block on which carbonizable cloth formed of materials such as rayon, cotton or other natural celluloses or rubber is laid and a second relatively thin slab of graphite which is placed over the cloth. The graphite-cloth-graphite sandwich is subjected to heating above 400° F. in an open furnace. The graphite serves to minimize oxidation of the carbonizable material by maintaining a neutral or reducing condition or atmosphere about the material. As a result, heating the material within the temperature range of 400° F. to 2800° F. for a sufficient time interval causes conversion of the cloth to a carbonized replica of the woven cloth material originally placed between the graphite blocks.

Other apparatus which has been utilized for the carbonization of carbonizable material is shown in FIGURES 3 and 4. In this apparatus, carbonizable material is supported in recesses provided in one or both of two carbon blocks, wherein it is protected from oxidation during the heating incident to carbonization. Spacers may be used to separate the carbon blocks of the sandwich and to permit volatiles to escape, but they are optional. The sandwich containing and confining the carbonizable material is placed in a furnace where the conversion to metal carbide is to take place. With the apparatus shown in FIGURES 2–4, the carbonizable material is preferably carbonized in the presence of a suitable atmosphere during the preliminary heating while bringing the furnace contents to the reaction temperature for conversion to metal carbide. This permits a carbonized replica of the carbonizable material to be produced immediately prior to its conversion to metal carbide and thus the process may be continuous.

FIGURE 5 shows an apparatus for carrying out the process using either a carbonizable material or a carbonized material. As shown, the carbonizable or carbonized fiber, cloth, etc. is placed on a graphite block and is inserted in a mullite tube which has been previously coated with colloidal carbon on its inside surface to facilitate maintenance of a reducing atmosphere during the carbonization and subsequent conversion of the carbonized material to a carbide replica of the original material.

The tube and its contents are heated to the desired reaction temperature in the presence of hydrogen gas dried to a dew point of less than minus 40° F. or other suitable carrier gas and then valves are opened to connect the hydrogen supply and mullite tube to a reservoir of metal halide or other suitable volatizable compound of the carbide forming metal. The latter compound may be in gaseous, liquid, or solid form. Opening suitable valves permits the hydrogen to flow either over the surface of the compound of the carbide forming element or through the compound, and thence to the mullite tube wherein it contacts the carbonized material therein. Heat may be applied to the vessel containing the compound of the carbide forming element in order to vaporize a portion thereof so that the hydrogen entrains a sufficient amount of vaporized compound to effect the desired reaction between the carbonized material and the carbide forming element in said vapor.

The conditions required for the formation of metal carbides by reaction of titanium tetrachloride, hydrogen and carbon, are known when the carbide is formed according to the equation:

$$TiCl_4 + 2H_2 + C \rightleftharpoons TiC + 4HCl$$

The present process is predicated on the new result obtained when the mixture of suitable metal compound vapor and carrier gas is passed over a carbonized product having a particular physical configuration which is a replica of the original non-carbonized form. e.g. when it is a filament, woven or felted article. In the process of this invention, the compound of the carbide forming element is maintained at a temperature such that it exhibits a vapor pressure of at least about 10 mm. of mercury at whatever pressure is present in its container. For solid materials, this usually requires that they be heated either in the reaction chamber, or preferably outside the reaction chamber e.g. in the reservoir shown in FIGURE 5.

The process is subject of modification as to materials, temperatures and duration of the several steps. Thus, while it is presently preferred to utilize the chlorides of the metals, because they are readily and economically available, it is also possible to utilize the bromides and iodides of the metals with suitable alteration in the operating temperatures, or in the case of some metals, especially tungsten and molybdenum, to utilize the carbonyls.

For the conversion of carbonized materials to carbides, hydrogen is a preferred carrier gas for the vaporized compound of the carbide forming element. Mixtures of hydrogen and inert gases such as argon have also been found to be suitable as the carrier gas for the compound of the carbide forming element.

The following serves to define the lowest practical temperatures for formation of the various carbides by the generalized equation:

$$MX_n + \tfrac{1}{2}nH_2 + C \rightarrow MC + nHX$$

where M represents boron, silicon or a metal of the metallic half of Groups IV, V, and VI of the mendeleev Periodic Table and X represent CO, chlorine, bromine or iodine and $n$ is an integer, usually 4, 5 or 6. The tabulation below is not all-inclusive since the kinetics of practical transformation depends upon the particular chemistry of a system as defined by various reactants yielding metal carbide and other products. Since metal chlorides are easily obtainable for this transformation, the limiting minimum temperatures are given for the chlorides unless otherwise noted.

TABLE I

| Metal halide: | Minimum practical transformation temperatures, °F. |
|---|---|
| Titanium tetrachloride | 1922 (at 1 atmosphere). |
| Zirconium tetrachloride | 2372 (at 1 atmosphere). |
| Hafnium tetrachloride | 2462 (at 1 atmosphere). |
| Vanadium pentachloride | 2012 (at 1 atmosphere). |
| Boron trichloride | 1652 (at 1 atmosphere). |
| Silicon tetrachloride | 1832 (at 1 atmosphere). |
| Tungsten (carbonyl) | 572 (at 10 mm. Hg°). |
| Molybdendum (carbonyl) | 572 (at 10 mm. Hg°). |
| Niobium pentachloride | 1832 (at 1 atmosphere). |
| Tantalum pentachloride | 1922 (at 1 atmosphere). |
| Chromium hexachloride | 1382 (at 1 atmosphere). |

The procedures described above have been used to fabricate metal carbides as cloth (gabardine, broadcloth and felted weave patterns), wool (polycrystalline monofilaments), single crystal whiskers, roving, and wire reinforced cloth. The fabrication and forms of metal carbide produced are useful as incandescent lamp filaments, catalyst supports, high temperature filter media, temperature resistant fabrics, and the like.

The following examples will serve to further illustrate the invention and are considered illustrative of preferred modes of carrying out the same.

Example 1

Amorphous carbon cloth was first produced by carbonizing gabardine weave rayon cloth. The rayon cloth was heated at 500° F. for three hours in an ambient air atmosphere after having been placed between two graphite blocks. The resultant carbonized cloth retained the original weave pattern and suffered only a slight volume shrinkage. It was dull black in color, flexible, and relatively strong although not as strong as the original rayon cloth.

The carbonized cloth supported on a graphite block, used as a setter, was inserted into a mullite tube which has been previously coated on the inside with colloidal graphite. The graphite inner coating was used to insure the presence of a reducing atmosphere about the cloth of dry hydrogen gas. By bubbling dried hydrogen gas through titanium tetrachloride (M.P. −13° F; B.P. 277° F.) and by utilizing the apparatus shown in FIGURE 5 titanium tetrachloride vapor was admitted into the reaction chamber and to the hot carbon cloth and graphite setter. After a period of one hour, sufficient TiCl₄ and hydrogen had been brought into contact with the cloth to completely react with the carbon cloth to form TiC. The cloth and setter samples were then cooled to room temperature while under a reducing atmosphere of dry hydrogen gas.

When cooled to room temperature, the cloth and block were removed for examination. Macroscopic and microscopic examination revealed the following. The cloth was now a dull gray and metallic in appearance. It was brittle, but possessed a higher strength than did the original carbon cloth. Little volume change was noted and the cloth retained the original weave pattern of the starting rayon cloth. When struck, the carbide cloth has a metallic ring. Under microscopic examination, the fibers of the cloth appeared coarser than the intermediate carbonized fibers. X-ray diffraction analysis indicated that the cloth was composed solely of titanium carbide. Sharp diffraction patterns were obtained.

The front end of the graphite setter block which faced the incoming gases was covered with a loose mat of wool-like polycrystalline fibers up to 1.5 inches in length. Under microscopic examination and X-ray study these were found to be a mixture of single crystal whiskers and of polycrystalline fibers of a wool type. The block itself was coated with a dull gray, tightly adherent metallic skin of TiC which was difficult to scratch. Dispersed somewhat uniformly over this block were very fine, single crystal whiskers of TiC. Many of these exhibited growth in a branch-like manner with angles of approximately 120–130°.

It will be seen that the process produced four distinct products, depending on the carbonaceous materials involved.

Example 2

The procedure of Example 1 was repeated using boron trichloride in place of titanium tetrachloride and previously carbonized rayon cloth in place of uncarbonized cloth. Utilizing an apparatus similar to that shown in FIGURE 5, but suitably modified, boron trichloride gas at room temperature was mixed into the dry hydrogen carrier gas stream and swept into the mullite tube when the tube and cloth were at 2700° F. Sufficient boron trichloride was admitted over a period of two hours to react completely with the carbonized cloth. The furnace and cloth were cooled to room temperature in a hydrogen atmosphere before removing the cloth for examination.

The cloth was a satin gray in color and has a metallic ring when struck. The cloth was a replica of the original carbonized cloth in appearance of weave and overall geometry with no sign of visible volume change. The cloth was much stronger than the carbonized cloth. X-ray diffraction confirmed the cloth as being composed almost solely of boron carbide (B₄C) with sharp diffraction patterns. The original carbonized fibers appear to have become somewhat coarser as a result of the conversion to carbide.

Example 3

The procedure of Example 1 was repeated using niobium pentachloride in place of titanium tetrachloride. Since niobium pentachloride has a boiling point of 400° F. and a vapor pressure of 10 mm. of mercury at about 280° F., it was necessary to heat the niobium pentachloride to get sufficient vapor into the reaction zone of the apparatus. Ten grams of niobium pentachloride was placed on a graphite setter and this was inserted into the mullite tube at a position previously determined to reach 392° F. when the reaction chamber and carbonized rayon cloth specimen reached 2700° F. The dry hydrogen carrier gas continuously passed over the niobium pentachloride during the procedure. The conversion was then carried out as in Example 1. After the heating cycle was completed no niobium pentachloride was found remaining on the graphite setter. The carbide cloth was examined and found to have the general characteristic of a metal carbide cloth as described previously for titanium carbide and boron carbide cloth. X-ray diffraction confirmed the cloth as a particularly pure form of niobium carbide.

TABLE II

[Formation of carbides by reaction $MCl_x + \frac{1}{2}xH_2 + C \rightarrow MC + xHCl$]

| Carbides | Carbide-Former Volatization Temperatures | Reaction Temperature, °F. |
|---|---|---|
| ZrC | $ZrCl_4$, 446° F | 2,700 |
| VC | $VCl_4$, 82° F | 2,500 |
| TaC | $TaCl_5$, 230° F | 2,500 |
| NbC+TiC | $\{NbCl_5, 280° F \atop TiCl_4, 68° F\}$ | 2,700 |
| WC [1] | $WCl_6$, 375° F | 2,700 |

[1] This reaction proceeded more satisfactorily when the carrier gas or reaction chamber atmosphere was a mixture of 95% argon and 5% hydrogen.

We claim:

1. A method of preparing carbide products which comprises:
   carbonization of a carbonizable organic material selected from the group consisting of carbonizable filaments and products consisting of woven, non-woven or felted carbonizable filaments by heating said material to a temperature between 400° F. and 2800° F. and in a non-oxidizing atmosphere to distill off noncarbonaceous residue from said carbonizable material while said carbonizable material is supported in a manner such that the physical shape and structure of the original material are retained;
   and then converting the resulting carbonized product to carbide of at least one element selected from the group consisting of boron, silicon, titanium, zirconium, hafnium, thorium, vanadium, niobium, tantalum, chromium, molybdenum, tungsten and uranium by heating the carbonized material in an atmosphere containing as vapor a compound selected from the group consisting of halides and carbonyls of said carbide forming element in an amount sufficient to provide a vapor pressure of at least 10 mm. Hg in said atmosphere.

2. The process of claim 1 wherein the compound is a halide of said elements.

3. The process of claim 1 wherein the atmosphere is selected from the group consisting of dried hydrogen and mixtures of dried hydrogen and noble gas.

4. The process of claim 1 wherein the carbonizable material is a woven cloth.

5. A cloth article consisting of metal carbide produced by the process of claim 1.

References Cited by the Examiner

UNITED STATES PATENTS

| | | | |
|---|---|---|---|
| 683,085 | 9/1901 | Voelker | 23—208 |
| 2,758,940 | 8/1956 | Baker et al. | 23—209.2 X |
| 3,011,981 | 12/1961 | Soltes. | |
| 3,100,688 | 8/1963 | Dess | 23—208 |
| 3,121,050 | 2/1964 | Ford | 23—209.4 X |

OTHER REFERENCES

Campbell et al.: "The Vapor-Phase Deposition of Refractory Materials," Transactions of the Electrochemical Society, November 1949, pp. 318–33.

O'Connor et al.: Silicon Carbide, Pergamon Press, New York, 1960, pp. 47–48 and 78–82.

Schmidt et al.: "Carbon-base Fiber Reinforced Plastics," Chemical Engineering Progress, vol. 58, No. 10, October 1962, pp. 40–50.

Schwarzkopf et al.: Refractory Hard Metals, MacMillan Co., New York, 1953, pp. 56 and 59–60.

BENJAMIN R. PADGETT, *Acting Primary Examiner.*

MAURICE A. BRINDISI, LEON D. ROSDOL,
*Examiners.*

G. OZAKI, S. TRAUB, *Assistant Examiners.*